United States Patent [19]

Stevenson et al.

[11] 3,821,804

[45] June 28, 1974

[54] SERVO SYSTEM FOR POSITIONING DATA TRANSDUCER

[76] Inventors: Timothy John Stevenson, 163, Clewer Rd., Windsor; Raymond Yardy, 4, Bartons Dr., Yately, near Camberley, both of England

[22] Filed: Jan. 17, 1973

[21] Appl. No.: 324,544

[30] Foreign Application Priority Data

Jan. 19, 1972 Great Britain ...................... 2602/72

[52] U.S. Cl. .......................................360/77, 360/78

[51] Int. Cl. ............................................ G11b 5/56

[58] Field of Search.... 340/174.1 B; 179/100.2 MD, 179/100.2 S

[56] References Cited

UNITED STATES PATENTS

| | | | |
|---|---|---|---|
| 3,126,535 | 3/1964 | Streeter | 340/174.1 C |
| 3,185,972 | 5/1965 | Sippel | 340/174.1 C |
| 3,295,117 | 12/1966 | Ault et al. | 340/174.1 C |
| 3,593,331 | 7/1971 | Connell | 340/174.1 C |
| 3,678,220 | 7/1972 | Luhrs | 340/174.1 C |
| 3,686,650 | 8/1972 | Gleim et al. | 340/174.1 C |

*Primary Examiner*—Vincent P. Canney
*Attorney, Agent, or Firm*—Hane, Baxley & Spiecens

[57] ABSTRACT

A servo system is disclosed for positioning a magnetic transducer in relation to a plurality of tracks on a disc record. A servo transducer moves across a plurality of servo tracks in synchronism with movement of the magnetic transducer. Discrete signals are recorded in the servo tracks in such a manner that movement of the servo transducer from one pair of servo tracks to generate track change signals which are different according to direction of movement of the transducer.

10 Claims, 2 Drawing Figures

SERVO SYSTEM FOR POSITIONING DATA TRANSDUCER

BACKGROUND OF THE INVENTION

This invention relates to servo systems.

Various forms of servo system have been proposed for causing a data transducer to follow a predetermined path, particularly in magnetic and optical data storage devices. Several of such proposals provide a servo transducer which is coupled to the data transducer to move with it, the servo transducer sensing a set of transducer tracks. In one form, adjacent tracks contain signals which differ in e.g., frequency or polarity, so forming two sub-sets of similar tracks. This provides for accurate tracking of the servo transducer. However, the change in the servo signal which occurs when the transducer moves from one track to another is independent of the direction of motion which must be determined by other means if an indication of the current track position of the transducer is to be maintained through a series of movements.

SUMMARY OF THE INVENTION

According to the invention a servo system for positioning a movable data transducer in relation to a plurality of parallel data tracks includes a plurality of servo tracks parallel to the data tracks; a group of discrete signal recordings spaced apart in each servo track, the recordings being so arranged that there are sets of at least first, second and third tracks in which the recordings are relatively displaced whilst the recordings of corresponding tracks in different sets are aligned; servo transducing means mounted for movement across the servo tracks in synchronism with the movement of the data transducer and so arranged that the servo transducing means is positioned symmetrically with respect to a pair of the servo tracks when the data transducer is aligned with a data track; control means responsive to changes in the signals sensed from each pair of tracks by the servo transducing means to generate a correction signal to maintain the data transducer aligned with a track; and tracking means responsive to the signals sensed by the servo transducing means in passing from one to another of the servo tracks to generate a track change signal.

BRIEF DESCRIPTION OF THE DRAWING

The invention will now be described, by way of example with reference to the accompanying drawing, in which.

DESCRIPTION OF PREFERRED EMBODIMENTS

Figures 1, 2:
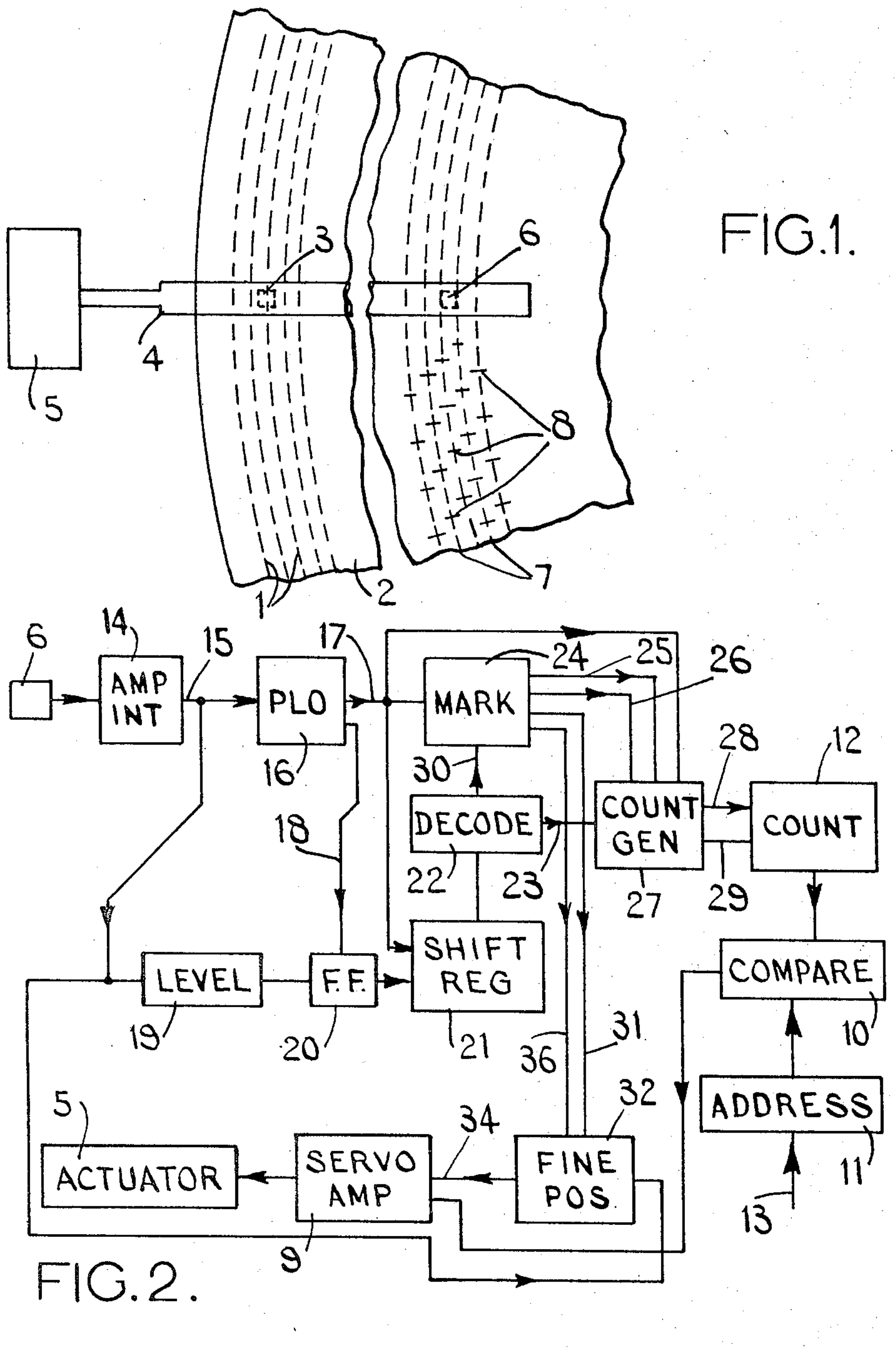
FIG. 1 is a schematic illustration of part of a magnetic disc file system.
FIG. 2 is a block diagram of an arrangement for providing servo control and track change signals.

Data may be recorded in, or read from, a group of parallel concentric data tracks 1 (FIG. 1) on a magnetic recording disc 2 by a data transducer head 3. The head 3 is mounted on a support arm 4 which may be moved radially of the disc by an actuator 5 to align the head 3 with a selected data track. The arm 4 also carries a servo transducer head 6. The head 6 reads a group of servo tracks 7, each of which contains discrete recorded signals 8. As will be seen from the drawings, the set of signals in each track are offset circumferentially in relation to the set of signals in the adjacent tracks in such a way that the signals are aligned in any two tracks which are separated by two other tracks. The heads 3 and 6 are so positioned on the arm 4 that the head 6 is symmetrically positioned between the centre lines of two of the tracks 7 when the head 3 is aligned with the centre line of one of the tracks 1.

The signals sensed by the head 6 from the tracks 7 are used in a manner to be explained, to control the actuator 5 to position the head 3 on any selected data track and to maintain it in alignment therewith. It will be appreciated that the spacing between the tracks and between the signals 8 has been exaggerated for the sake of clarity. The tracks 7 need not be on the same face of the disc 2 as the tracks 1. The tracks 7 may be recorded on the other face of the disc 2, or on a face of another disc of a conventional multi-disc assembly. The tracks 7 are recorded before the disc, or discs, are used for recording data, so that the exact position of the data tracks is determined by the position of the servo tracks in a repeatable manner provided that the movement of the heads 6 and 3, and any other data heads, is accurately synchronized. It will be appreciated that the discs of a multi-disc assembly must either be assembled in a fixed structure, or they must be mounted so that they can be re-assembled in accurately determined positions, as is normally provided for in conventional magnetic disc storage systems.

The actuator 5 is driven to align the data head 3 with a particular data track by a servo amplifier 9, which receives a control signal from a comparator 10. The comparator is controlled jointly by a track address register 11 and a track counter 12. The address of the required track is entered into the register 11 over a line 13. In conventional head servo systems the counter 12 is operated by signals from a position indicator which is coupled to the arm 4. The position indicator may consist of an optical scale which is sensed photoelectrically. The present system derives the signals for operating the counter 12 from the sensing of the servo tracks 7 by the head 6.

It has already been explained that the normal position of the head 6 is equidistant between the centre lines of a pair of adjacent tracks. The width of the head relative to the separation of the tracks 7 is such that the head picks up signals equally from both tracks of the pair when the head 6 is in its normal position. It will be seen that the head will produce a signal from a signal 8 in one track, followed by a signal 8 from the other track after a short interval, then a longer interval before the next pair of signals, and so on, as the disc 2 is rotated anti-clockwise.

It the head 6 is moved radially inward, the first signal of each pair will disappear as the head moves away from the corresponding track and then a new pulse will appear after the second signal of the pair as the head moves into the normal position between the next pair of tracks. Conversely, the second signal of the pair will disappear and a new signal will appear before the first signal of the pair if the head 6 is moved radially outwards. Hence the occurrence and the direction of the passage of the data head 3 from one track to the next is indicated by the phase shift of the signals from the servo head 6. Accordingly, the counter 12 may be operated by any suitable circuit which is responsive to this phase shift. One such circuit is shown in FIG. 2.

The tracks 7 are all magnetised in one direction except for the areas corresponding to the signals 8 which are magnetised in the opposite direction. The head 6 will produce a pair of pulses of opposite polarity for each recorded signal 8. The output of the head 6 is fed to an amplifying and integrating circuit 14 which provides a single pulse on output line 15 for each signal 8 which is read by the head. The pulses on the line 15 are used to synchronise a phase locked oscillator 16, the natural frequency of which is approximately three times the frequency of the signals read from any one of the tracks 7. The output of the oscillator is squared to provide a clock pulse waveform on output line 17, and the inverse of that waveform on line 18.

The pulses on the line 15 are also fed to a level detector 19, which produces an output when the input pulses exceed a predetermined amplitude level to drive a flip-flop 20. The flip-flop 20 is also driven by the inverse clock on the line 18. The combined effect of these two signals is to switch the flip-flop on for a clock interval if a pulse occurs on the line 15 and to switch the flip-flop off it a pulse does not occur. The state of the flip-flop is transferred every clock interval to the input stage of a three stage shift register 21, under control of the clock waveform on the line 17. The shift register stages control a decode logic net 22 which provides an output on line 23 when the register is set to 011.

The clock waveform on the line 17 also drives a three state marker circuit 24, which consists of a pair of flip-flops with gated reset so that the states of output lines 25 and 26 cycle through the pattern:

| | line 25 | line 26 |
|---|---|---|
| 1 | high | low |
| 2 | low | high |
| 3 | low | low |
| 4 | high | low |
| etc. | etc. | etc. |

When the head 6 is symmetrically placed between tracks, the states of the marker circuit are such that line 25 and 26 are high, respectively, during the occurrence of the first and second pulses of a pair. Both lines are low during the interval between each pair of pulses. The register setting 011 corresponds to a no pulse, pulse, pulse sequence on the line 15 and the register is also driven in synchronism with the marker circuit, so that the output will occur on the line 23 at a time when lines 25 and 26 are both low. A count generator circuit 27 gates together the signals on lines 23, 25 and 26 and 17. In the normal condition, the circuit 27 will not produce any signal on either output line 28 or 29.

It has been pointed out that the effect of a movement of the head 6, corresponding to the data head 3 moving from one track to the next is to produce the effect of a phase shift in the pulse timing. This shift is equivalent to one clock interval so that it does not affect the generation of the clock waveform and therefore the timing of the marker circuit 24 is not affected. However, the setting of the flip-flop 20 will be relatively advanced, or retarded, by one clock interval and consequently the time of occurrence of the pattern 011 in the register 21 will be similarly affected. Hence, the output of the decoder 22 on the line 23 will occur in coincidence with the line 25 or line 26 being high in accordance with the phase lag, or lead, of the waveform from the head 6. Such coincidence will allow a clock signal to be gated out on line 28, or line 29, to cause the value registered by the counter 12 to be increased, or decreased respectively, by unity. A signal is also gated out over line 30 to reset the marker circuit so that it runs in synchronism with the new pulse timing. Consequently, the count generator produces no more pulses until a further movement of the head 6 occurs.

In general terms, the circuit arrangement which has been described is effective to detect the occurrence and sign of a phase shift in the pulse pattern from the head 6 and to generate an output for operating the counter 12 accordingly. It will be appreciated that this detection may be carried out in other ways. For example, the first pulse of a pair may be used to trigger a timing chain which provides a time base against which to check the occurrence of the second pulse of the pair, the absence of a pulse and the occurrence of the next pulse of the pair. Thus, a phase shift in the pulse train can be detected and used to generate the appropriate counting pulses. Alternatively, the pulse train on the line 15 may be delayed by one or more complete cycles and compared with the undelayed waveform to detect the phase shift.

The information from the servo head 6 is used for fine position control as well as for track counting. The marker circuit 24 applies signals over lines 36 and 31 to a fine position control circuit 32. The signals on the lines 36 and 31 correspond to the signals on the lines 25 and 26 respectively and they are combined in the circuit 32 to provide a signal which is successively positive, negative and zero corresponding to the three different states of the marker circuit. This signal is used to multiply the signal on the line 15 in a balanced modulator to give a smoothed input on line 34 to the servo amplifier 9 which is representative of any fine position error in the position of the head 6, that is, an error of less than one track.

In effect, the amplitude of the first pulse of a pair is multiplied by a positive quantity, the second pulse is multiplied by a negative quantity, and the smoothing then produces an analogue signal which is proportional to the average difference in amplitudes between the first and second pulses of each pair. Clearly this difference is zero when the head 6 is symmetrically placed with respect to the centre lines of a pair of the tracks 7 and increases to a maximum when the head is aligned with one of the tracks 7.

The fine position error signal may be derived in other ways. For example, the pulses on the line 15 may be fed to a pair of sample and hold circuits of conventional design, which are controlled by the clock waveform, or by the marker circuit, so that each circuit deals with one pulse of a pair. Thus, any difference in amplitude of the pulses of a pair due to the head 6 not being correctly positioned between the tracks will produce a difference in voltage between the outputs of the two sample and hold circuits. This voltage difference may be amplified and smoothed to form the fine position error voltage for application over the line 34.

A system in which both the servo and data tracks are recorded magnetically has been described. It will be appreciated that either or both of the sets of tracks may be recorded in other forms, such as optically, if the appropriate form of transducer is employed.

The system will also operate satisfactorily with other track patterns for the servo tracks. There may be more than three signals in each set and the separation between signals in adjacent tracks need not be an exact sub-multiple of the separation between adjacent signals in the same track.

We claim:

1. A servo system for positioning a movable data transducer in relation to a plurality of parallel data tracks includes a plurality of servo tracks parallel to the data tracks; a group of discrete signal recordings spaced apart in each servo track, the recordings being so arranged that there are sets of at least first, second and third tracks in which the recordings are longitudinally displaced whilst the recordings of corresponding tracks in different sets are aligned; servo transducing means mounted for movement across the servo tracks in synchronism with the movement of the data transducer and so arranged that the servo transducing means is positioned symmetrically with respect to a pair of the servo tracks when the data transducer is aligned with a data track; control means responsive to changes in the signals sensed from each pair of tracks by the servo transducing means to generate a correction signal to maintain the data transducer aligned with a data track; and tracking means responsive to the signals sensed by the servo transducing means in passing from one to another of the servo tracks to generate a track change signal.

2. A servo system as claimed in claim 1 in which the signal recordings are positioned in the servo tracks so that the servo transducing means when positioned symmetrically with respect to a pair of tracks senses the signal recordings alternately from each track of the pair.

3. A servo system as claimed in claim 2 in which the servo transducing means senses signal recordings from adjacent servo tracks.

4. A servo system as claimed in claim 3 including a marker circuit operative to generate a sequence of states representing signals sensed from a pair of servo tracks and a track change circuit responsive to the sequence of conditions and to a train of signals produced in response to the servo transducing means sensing signal recordings to produce first and second track change signals respectively when the train of signals leads and lags relative to the sequence of states.

5. A servo system as claimed in claim 4 including means operative to reset the marker circuit into synchronism with the train of signals after the servo transducer has moved by one track space.

6. A servo system as claimed in claim 4 including a counter operative in response to each first track change signal to increase a count indication by unity and in response to each second track change signal to decrease the count indication by unity.

7. A servo system as claimed in claim 4 in which the second track extends between the first and second tracks; and the signal recordings in the first track are displaced relative to the signal recordings in the second track in a leading direction and the signal recordings in the third track are displaced relative to the signal recordings in the second track in a lagging direction.

8. A servo system as claimed in claim 4 including an oscillator circuit operative to generate timing signals in synchronism with sensing of the signal recordings, the oscillator circuit being operative to continue generating timing signals in the absence of signal recordings at a repetition rate corresponding to the displacement between signal recordings in adjacent servo tracks.

9. A servo system as claimed in claim 4 including a storage device for accumulating a portion of the train of signals and in which the track change circuit is responsive to the accumulation in said storage device of said portion of the train of signals and to the state of the marker circuit to produce said track change signals.

10. A servo system as claimed in claim 4 including a fine positioning circuit operative in response to the states of the marker circuit to invert the polarity of the signals received from one of a pair of adjacent servo tracks while leaving the polarity of the signals received from the other one of a pair of tracks unchanged and to generate a correction signal dependent upon the average amplitude of the resulting train of signals.

* * * * *